Oct. 30, 1923.　　　　　P. C. PHILIP　　　　　1,472,085
CREAM SEPARATOR
Filed April 8, 1922　　　　2 Sheets-Sheet 1

WITNESSES　　　　　　　　　　　　　　INVENTOR
　　　　　　　　　　　　　　　　　　　P. C. PHILIP,
　　　　　　　　　　　　　　　　　　BY
　　　　　　　　　　　　　　　　　　　ATTORNEYS

Oct. 30, 1923.

P. C. PHILIP

CREAM SEPARATOR

Filed April 8, 1922 — 2 Sheets-Sheet 2

1,472,085

WITNESSES

INVENTOR
P. C. Philip,
BY
ATTORNEYS

Patented Oct. 30, 1923.

1,472,085

UNITED STATES PATENT OFFICE.

PETER C. PHILIP, OF BOWLUS, MINNESOTA.

CREAM SEPARATOR.

Application filed April 8, 1922. Serial No. 550,805.

*To all whom it may concern:*

Be it known that I, PETER C. PHILIP, a citizen of the United States, and a resident of Bowlus, in the county of Morrison and State of Minnesota, have invented certain new and useful Improvements in Cream Separators, of which the following is a specification.

This invention relates to separators especially adapted for separating liquids having different specific gravities.

An important object of this invention is to provide a cream separator having novel means whereby the richness of the cream may be readily regulated by a simple adjusting means within convenient reach of the operator.

A further object is to provide a cream separator having simple means whereby the same may be taken apart for the purpose of cleaning and which may be readily assembled.

Other objects and advantages will be apparent during the course of the following description.

In the accompanying drawings:—

Figure 1:
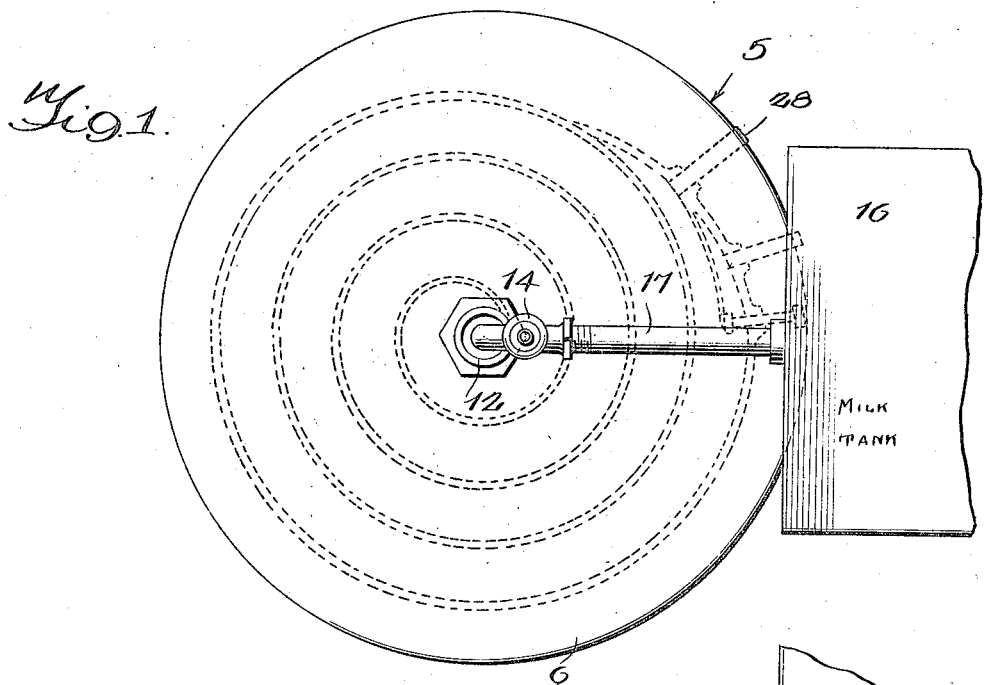
Figure 1 is a plan view of the improved separator.

In the drawings the numeral 5 generally designates the improved separator which consists of upper and lower disks 6 and 7 respectively, the lower disk being provided with a spiral dividing member 8 having a plurality of spaced convolutions which constitute a means for separating the cream from the skimmed milk. The upper portions of the convolutions of the divider are provided with enlargements 10 having grooves which receive washers 11 forming a means for providing a liquid tight connection between the upper disk 6 and the divider 8.

Figure 2:
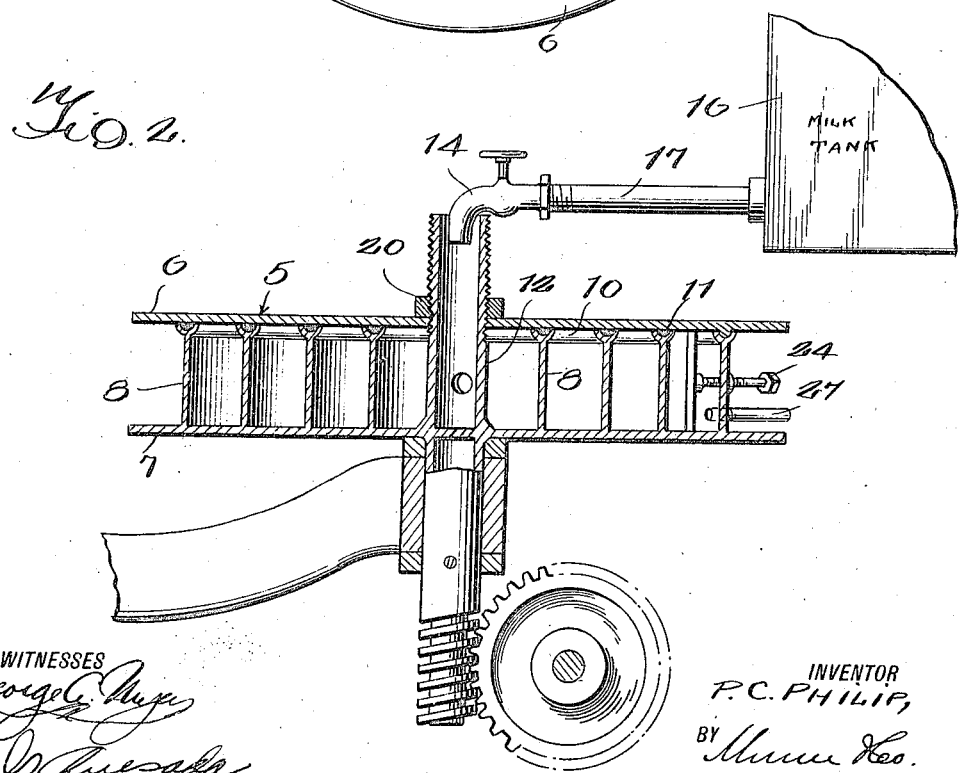
Figure 2 is a vertical sectional view through the same.

As illustrated in Figure 2 a pipe 12 is extended through the bowl formed by the upper and lower disks and the divider and the said pipe extends for a substantial distance above the upper disk 6 so as to form an inlet means for the milk to be separated. A suitable spigot 14 is extended into the mouth of the pipe 12 and the said spigot is connected to a milk tank 16 by means of a pipe 17. With reference to Figure 2, it will be observed that the extended portion of the pipe 12 is exteriorly screw threaded for engagement with a nut 20 which forms a means for urging the upper disk 6 firmly into engagement with the divider which may be formed integral with or otherwise securely connected to the lower disk 7. When desired, the nut 20 may be removed for taking the separator apart for the purposes of cleaning or repairing.

Figure 3:
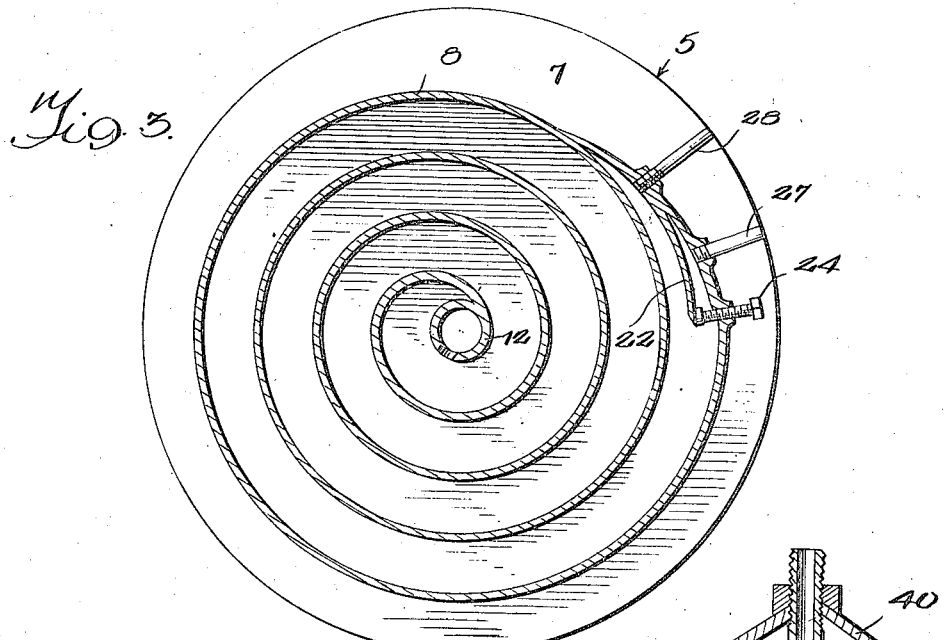
Figure 3 is a horizontal sectional view through the separator.
Figure 4:
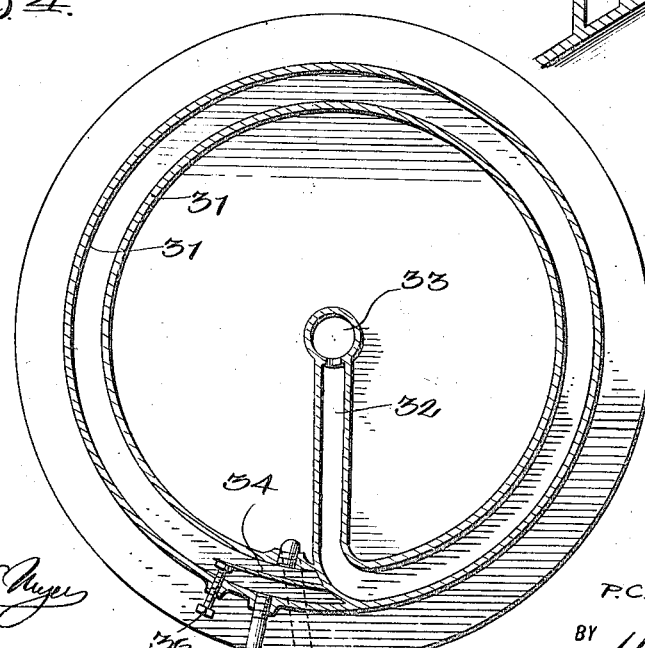
Figure 4 is a horizontal sectional view illustrating a modified form of invention.

The inner convolution of the divider is secured to the pipe 12 while the outer convolution is secured to the adjacent convolution so as to prevent the escape of the milk when the bowl is rotated. As illustrated in Figures 2 and 3, a wing 22 is secured to the outer convolution adjacent a terminal portion of the same and may be adjusted with relation to the outer convolutions by means of a set screw 24 threaded through the outer convolution. That is to say, the wing 21 is adjustable in the spiral trough which receives the liquid to be separated and as the cream flows adjacent the outer walls of the convolutions the wing 22 may be adjusted with relation to the cream for varying the richness of the same. As is well known the difference in the specific gravity between the milk and the cream causes the milk to separate from the cream when subjected to the centrifugal force incident to the rotation of the bowl. Milk and cream outlet pipes 27 and 28 respectively are connected to the divider at the discharge compartments formed by the wing 22 and form a means whereby the milk and the cream may be conveyed to suitable receivers. In the form of the invention illustrated in Figure 4 the bowl 30 is provided with spaced annuli 31 which form a divider for separating the cream from the milk. The divider is supplied with liquid from a radially arranged conduit 32 extending from a centrally arranged pipe 33. The trough or channel which receives the milk is provided with a wing 34 having its terminal portion in engagement with a set screw 36 which provides a means whereby the wing may be adjusted for varying the thickness of the cream.

Figure 5:
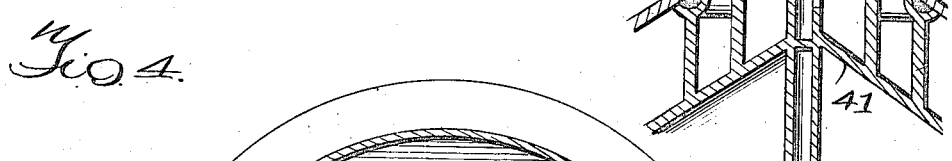
Figure 5 is a detail sectional view illustrating a further modification of the invention.

In the form of the invention illustrated in Figure 5, the upper and lower disks 40 and 41 respectively may be dished so that the liquid will flow more readily. That is to say, by reason of inclining the upper and lower disks downwardly toward their outer edges the flow of the liquid outwardly is expedited.

Having thus described the invention, what is claimed is:—

1. A cream separator comprising a pair of disks, a divider arranged between said disks and having a plurality of convolutions, the outer convolution of which is secured to the adjacent convolution to form a closure, a wing secured to the outer convolution adjacent the end of the same, and separate outlets for the skim milk and the cream.

2. The construction set forth in claim 1, and means to adjust said wing to vary the richness of the cream.

3. A cream separator comprising a divider having a plurality of convolutions, the outer convolution being secured to the adjacent convolution to form a closure, and a wing arranged between the outer convolution and the adjacent convolutions and forming the separating element, there being outlets for the skim milk and the cream.

4. The construction set forth in claim 3, and a set screw threaded through the outer convolution and engaging said wing for forming the means whereby the position of the wing may be manually varied.

PETER C. PHILIP.